United States Patent
Angermann et al.

(10) Patent No.: US 9,971,320 B2
(45) Date of Patent: May 15, 2018

(54) METHODS AND SYSTEMS FOR ADAPTIVE TRIGGERING OF DATA COLLECTION

(71) Applicant: Google LLC, Mountain View, CA (US)

(72) Inventors: Michael Angermann, Mountain View, CA (US); Martin Frassl, Mountain View, CA (US); Brian Patrick Williams, Mountain View, CA (US); Patrick Otto Robertson, San Jose, CA (US)

(73) Assignee: Google LLC, Mountain View, CA (US)

( * ) Notice: Subject to any disclaimer, the term of this patent is extended or adjusted under 35 U.S.C. 154(b) by 869 days.

(21) Appl. No.: 14/331,945

(22) Filed: Jul. 15, 2014

(65) Prior Publication Data

US 2016/0003972 A1  Jan. 7, 2016

Related U.S. Application Data

(60) Provisional application No. 62/020,861, filed on Jul. 3, 2014.

(51) Int. Cl.
G05B 15/02 (2006.01)
(52) U.S. Cl.
CPC ...... G05B 15/02 (2013.01); *G05B 2219/2642* (2013.01)
(58) Field of Classification Search
CPC .................................................. G05B 15/02
USPC ............................................................ 702/5
See application file for complete search history.

(56) References Cited

U.S. PATENT DOCUMENTS

| 6,993,442 | B2 | 1/2006 | Kanevsky et al. |
| 8,649,565 | B1 | 2/2014 | Kim et al. |
| 8,798,840 | B2 * | 8/2014 | Fong .................... G05D 1/0274 700/258 |
| 2005/0182518 | A1 | 8/2005 | Karlsson |
| 2007/0118253 | A1 | 5/2007 | Dahler |
| 2010/0121488 | A1 | 5/2010 | Lee et al. |
| 2013/0311137 | A1 * | 11/2013 | Schaum .................. G06F 17/18 702/181 |

OTHER PUBLICATIONS

Patrick Robertson, Michael Angermann, Bernhard Krach, "Simultaneous Localization and Mapping for Pedestrians using only Foot-Mounted Inertial Sensors," Proc. Ubicomp 2009, Sep. 30-Oct. 3, 2009, Orlando, Florida.

* cited by examiner

*Primary Examiner* — Ricky Ngon
(74) *Attorney, Agent, or Firm* — McDonnell Boehnen Hulbert & Berghoff LLP

(57) ABSTRACT

A computing system may receive a map of features in an environment. The computing system may identify one or more regions of the map for data collection. The computing system may receive sensor data from a plurality of devices. The sensor data may be associated with one or more periods of time when the sensor data was collected by the plurality of devices. The computing system may determine a likelihood of one or more devices being within a portion of the environment that corresponds to the one or more regions of the map for data collection during a future period of time. The computing device may provide a request for given sensor data from the one or more devices based on the likelihood. The given sensor data may be associated with the future period of time.

13 Claims, 6 Drawing Sheets

METHODS AND SYSTEMS FOR ADAPTIVE TRIGGERING OF DATA COLLECTION

CROSS-REFERENCE TO RELATED APPLICATION

This application claims priority to U.S. Provisional Patent Application Ser. No. 62/020,861, filed on Jul. 3, 2014, the entirety of which is herein incorporated by reference.

BACKGROUND

Unless otherwise indicated herein, the materials described in this section are not prior art to the claims in this application and are not admitted to be prior art by inclusion in this section.

A network of sensors may include spatially distributed sensors to monitor physical or environmental conditions, such as temperature, sound, pressure, etc. The sensors may be arranged in fixed positions or may be moveable to have different positions at different times. The network may then wirelessly transmit data from the sensors to a main system for analysis or display. Such network may be utilized in various applications, such as industrial, consumer, or health applications.

SUMMARY

In one example, a method is provided that comprises receiving a map of physical features in a physical environment by a computing system that includes one or more processors. The method further comprises identifying one or more regions of the map for data collection. The method further comprises receiving sensor data from a plurality of devices. The sensor data may be associated with one or more periods of time when the sensor data was collected by the plurality of devices. The method further comprises determining a likelihood of one or more devices of the plurality of devices being with a portion of the physical environment that corresponds to the one or more regions of the map for data collection during a future period of time. Determining the likelihood may be based on the sensor data from the plurality of devices. The method further comprises providing a request for given sensor data from the one or more devices based on the likelihood being greater than a threshold likelihood. The given sensor data may be associated with the future period of time. The given sensor data may pertain to the physical features in the physical environment.

In another example, a computing system is provided that includes one or more processors and data storage configured to store instructions executable by the one or more processors. The instructions may cause the computing system to receive a map of physical features in a physical environment. The instructions may also cause the computing system to identify one or more regions of the map for data collection. The instructions may also cause the computing system to receive sensor data from a plurality of devices. The sensor data may be associated with one or more periods of time when the sensor data was collected by the plurality of devices. The instructions may also cause the computing system to determine a likelihood of one or more devices of the plurality of devices being within a portion of the physical environment that corresponds to the one or more regions of the map for data collection during a future period of time. The determination of the likelihood may be based on the sensor data from the plurality of devices. The instructions may also cause the computing system to provide a request for given sensor data from the one or more devices based on the likelihood being greater than a threshold likelihood. The given sensor data may be associated with the given period of time. The given sensor data may pertain to the physical features in the physical environment.

In yet another example, a method is provided that comprises a device determining a plurality of datasets indicative of output from one or more sensors during a plurality of time-periods within a given period of time. The device may include one or more processors. The output from the one or more sensors may be indicative of features in an environment of the device. The method further comprises receiving a request for data collection by the device from a computing system. The request for the data collection may be according to one or more criteria. The one or more criteria may include a given feature of the features in the environment, a threshold rate of change of the given feature, a position of the device associated with the collected data, or a particular time-period associated with the collected data. The method further comprises determining rankings for the plurality of datasets. The rankings may be based on an association between the plurality of datasets and the one or more criteria. The method further comprises receiving configuration data indicative of a threshold number of datasets that are associated with the given period of time for provision by the device to the computing system. The method further comprises identifying one or more datasets from within the plurality of datasets based on the rankings A number of the one or more datasets may correspond to the threshold number. The method further comprises the device providing the one or more datasets for receipt by the computing system.

In still another example, a system is provided that comprises a means for receiving a map of physical features in a physical environment by a computing system that includes one or more processors. The system also comprises a means for identifying one or more regions of the map for data collection. The system also comprises a means for receiving sensor data from a plurality of devices. The sensor data may be associated with one or more periods of time when the sensor data was collected by the plurality of devices. The system also comprises a means for determining a likelihood of one or more devices of the plurality of devices being with a portion of the environment that corresponds to the one or more regions of the map for data collection during a future period of time. Determining the likelihood may be based on the sensor data from the plurality of devices. The system also comprises a means for providing a request for given sensor data from the one or more devices based on the likelihood being greater than a threshold likelihood. The given sensor data may be associated with the future period of time. The given sensor data may pertain to the physical features in the physical environment.

In yet another example, a system is provided that includes a means for a device determining a plurality of datasets indicative of output from one or more sensors during a plurality of time-periods within a given period of time. The device may include one or more processors. The output from the one or more sensors may be indicative of features in an environment of the device. The system also comprises a means for receiving a request for data collection by the device from a computing system. The request for the data collection may be according to one or more criteria. The one or more criteria may include a given feature of the features in the environment, a threshold rate of change of the given feature, a position of the device associated with the collected data, or a particular time-period associated with the collected data. The system further comprises a means for determining rankings for the plurality of datasets. The rankings may be based on an association between the plurality of datasets and the one or more criteria. The system further comprises a means for receiving configuration data indicative of a threshold number of datasets that are associated with the given period of time for provision by the device to the computing system. The system further comprises a means for identifying one or more datasets from within the plurality of datasets based on the rankings A number of the one or more datasets may correspond to the threshold number. The system further comprises a means for the device providing the one or more datasets for receipt by the computing system.

These as well as other aspects, advantages, and alternatives, will become apparent to those of ordinary skill in the art by reading the following detailed description, with reference where appropriate to the accompanying figures.

DETAILED DESCRIPTION

Figure 1:
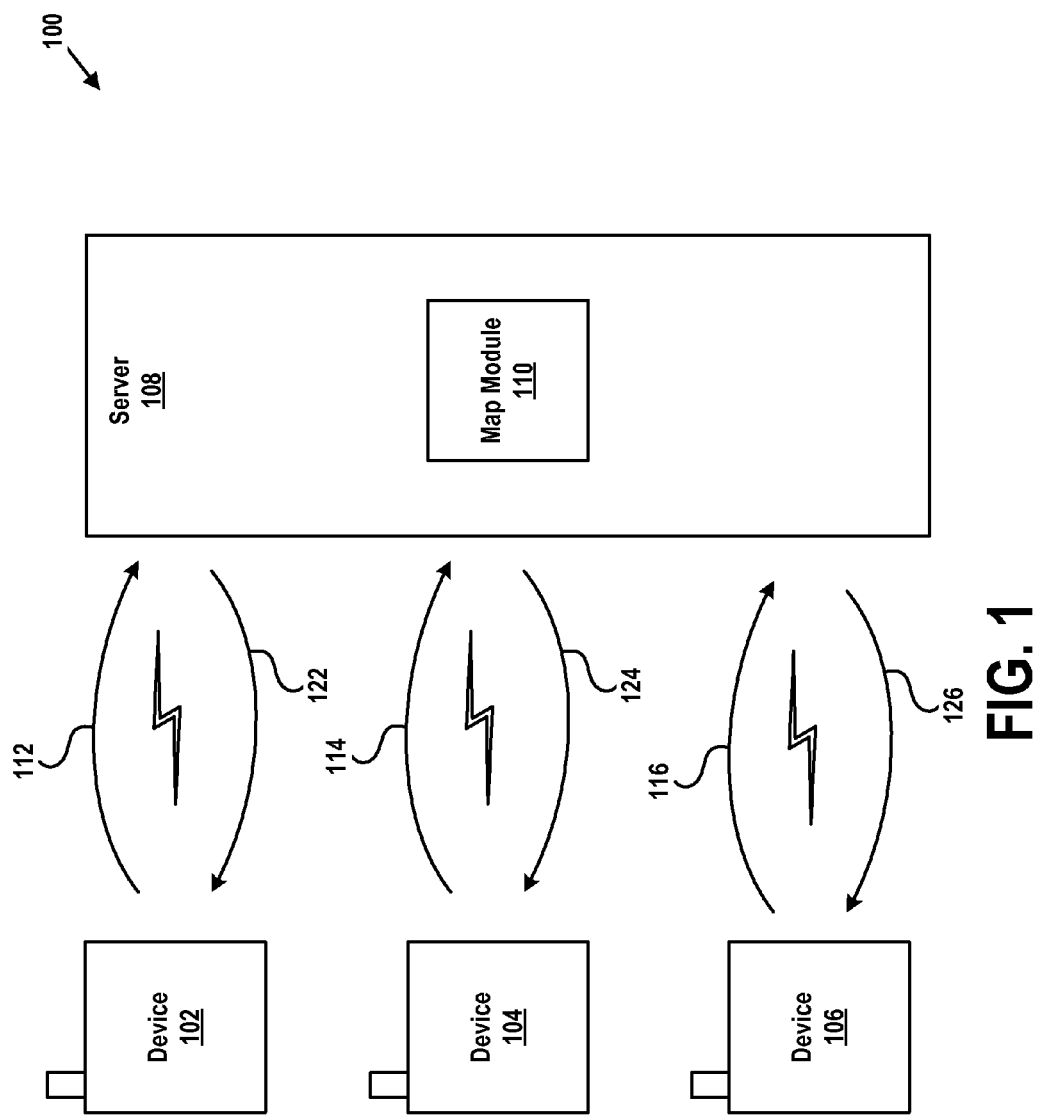
FIG. 1 illustrates an example system in which an example method may be implemented.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Within examples, a plurality of devices may be provided that are configured to collect data from one or more sensors indicative of features in an environment of the plurality of devices. The plurality of devices, for example, may include mobile devices such as smartphones, tablets, etc., or sensor systems mounted to moving vehicles such as a cars or trucks. Alternatively, for example, the plurality of devices may be arranged at particular positions in the environment. The environment may be a physical and/or a geographical environment such as an outdoor space, an indoor space, an underwater space, a subterranean space, etc. In some examples, the features may include physical features in the environment such as objects, wireless transmitters, magnetic field, electromagnetic radiation pattern, sounds, etc. Additionally or alternatively, the features may include environmental conditions in the environment such as temperature, pressure, altitude, signal strengths of the wireless transmitters, direction of motion of the objects, speeds of the objects, etc. Further, in some examples, the features may include given features that pertain to motion of the objects in the environment. For example, elements such as doors, stairs, elevators, corridors, etc., may influence a pattern of motion of people in the environment of the plurality of devices, and in turn, the plurality of devices may collect data pertaining to such features.

Further, in some examples, the plurality of devices may be coupled to a server, or any other computing device, and configured to provide at least a portion of the collected data to the server. The server, for example, may utilize the provided data to construct and/or maintain a map of the features in the environment. The map, for example, may correspond to a geographical map of the features or a virtual map of the environmental conditions (e.g., signal strengths, etc.). Such map may be useful in various systems such as navigational systems, localization systems, communication systems, etc. In one example, a wireless communications provider may utilize the map to optimize locations for new/existing wireless transmitters. In another example, a navigational system provider may utilize the map to identify one-way streets in outdoor spaces or general direction of motion in hallways of indoor spaces. Other examples are possible as well.

In some examples, the data provided by the plurality of devices may be insufficient for the server to generate and/or update particular regions of the map. By way of example, a given device may be configured to provide a given number (e.g., three, etc.) of datasets (e.g., sensor traces, etc.) that are each associated with a particular duration (e.g., five minutes, etc.) within a given day. Further, in the example, the datasets provided by the given device may correspond to regions of the map other than the particular regions.

Accordingly, in some examples, the present disclosure may provide methods and systems for adaptive triggering of data collection by the plurality of devices for the server to receive sensor data that may be utilized to update and/or generate the map.

In one example, the server may identify one or more regions of the map for data collection based on previous data received from the plurality of devices or lack thereof. For example, the server may identify the one or more candidate regions that were not recently updated, or that exhibit frequent change (e.g., regions where new Wifi signals are detected frequently), etc. The server may then, for example, determine likelihood that one or more devices of the plurality of devices may be in the one or more regions at a later time based on the previous data received from the one or more devices. In this example, the server may then provide a request to the one or more devices to provide given sensor data associated with the later time.

In another example, the server may provide the request to the given device for data collection that includes one or more criteria such as a given feature, a threshold rate of change of the given feature, a position of the device when the data is collected, a particular time-period when the data is collected, etc. In this example, the given device may then trigger collection of the data based on the one or more criteria, or may select datasets for transmission that have a given association with the one or more criteria. For example, the given feature may correspond to sounds in the environment, the device may detect a rate of change of the sounds (e.g., frequency, intensity, etc.) that is greater than the threshold rate, and the device may responsively provide to the server the given sensor data associated with a particular time when the rate of change was detected.

Other examples are possible as well and are described with greater detail in embodiments of the present disclosure.

Referring now to the figures, FIG. 1 illustrates an example system 100 in which an example method may be implemented. In FIG. 1, client devices 102-106 may communicate with a server 108 via one or more wired and/or wireless interfaces. The devices 102-106 and the server 108 may communicate within a network. Alternatively, the devices 102-106 and the server 108 may each reside within a respective network.

The devices 102-106 may be any type of computing device or transmitter including a laptop computer, a mobile telephone, or tablet computing device, etc., that is configured to transmit data 112-116 to or receive data/requests 122-126 from the server 108 in accordance with the method and functions described herein. The devices 102-106 may include a user interface, a communication interface, a processor, and data storage comprising instructions executable by the processor for carrying out one or more functions relating to the data sent to, or received by, the server 108. The user interface may include buttons, a touchscreen, a microphone, and/or any other elements for receiving inputs, as well as a speaker, one or more displays, and/or any other elements for communicating outputs. Further, the devices 102-106 may include one or more sensors configured to provide output indicative of features in an environment of the devices 102-106. For example, as the devices 102-106 traverse in the environment, the output from the sensors may be processed by the devices 102-106 to provide the data 112-116 to the server 108 in accordance with the instructions (data) 122-126 received from the server 108.

The server 108 may be any entity or computing device arranged to carry out the method and computing device functions described herein. Further, the server 108 may be configured to send data/requests 122-126 to or receive data 112-116 from the devices 102-106. The server 104 may include a map module 110 which may be configured to process the data 112-116 received from the devices 102-106 to determine or update a map of the features in the environment of the devices 102-106.

The data 112-116 received by the server 108 from the devices 102-106 may take various forms. For example, the device 102 may provide information indicative of a given feature (e.g., magnetic field, etc.) in the environment of the device 102, movement of the device 102, or sensor data from sensors of the device 102. The server 108 may then process the data 112-116 to generate or update the map of the environment.

The data/requests 122-126 sent to the devices 102-106 from the server 108 may take various forms. For example, the server 108 may send to the device 104 an indication of particular regions of the environment for data collection, a threshold rate of change of one or more of the features in the environment, or a particular time-period for data collection.

Figure 2:
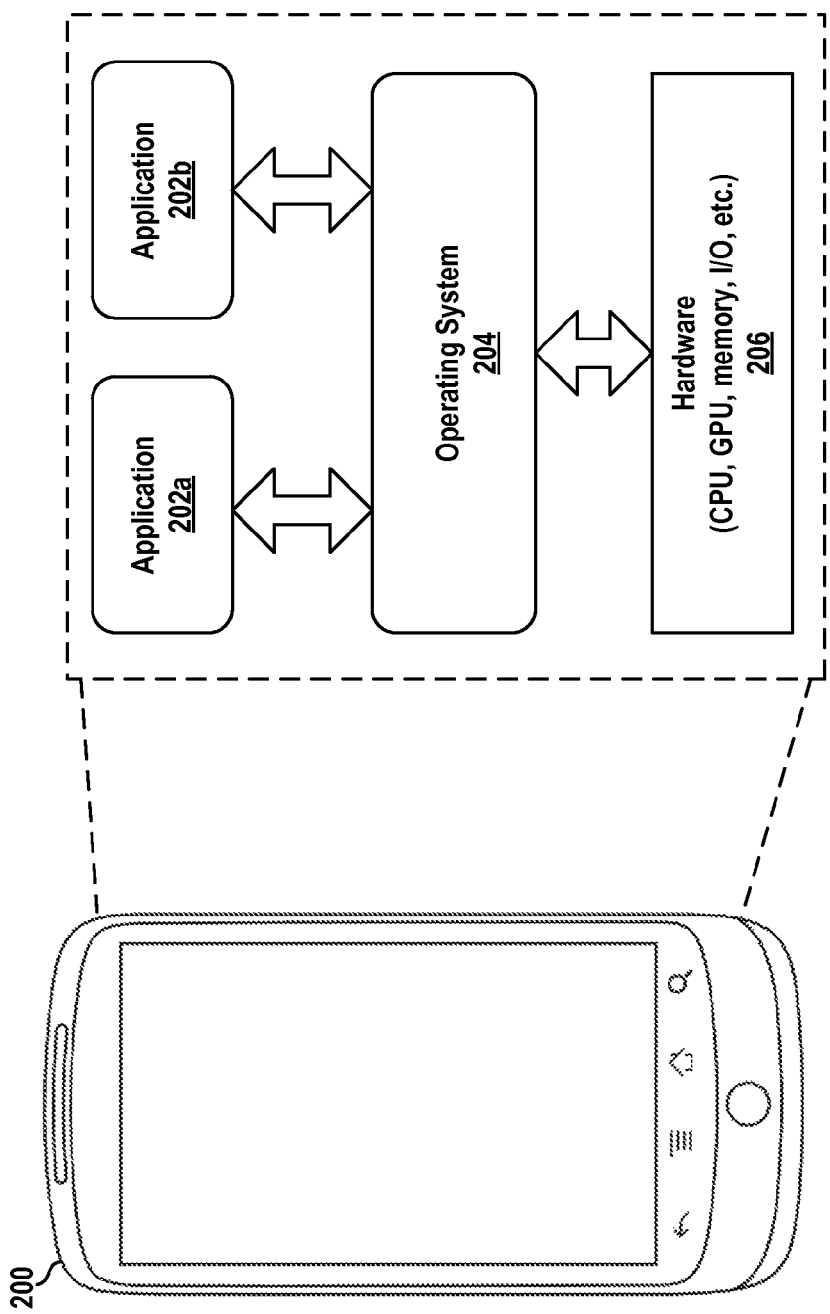
FIG. 2 illustrates an example device by which an example method may be implemented.

FIG. 2 illustrates an example device 200 by which an example method may be implemented. The device 200 may include applications 202a and 202b and an operating system 204 being executed by hardware 206. Although the example device 200 is a smartphone, aspects of this disclosure are applicable to other computing devices such as PCs, laptops, tablet computers, etc. The device 200 may be similar to the devices 102-106 of the system 100. For example, the device 200 may include one or more sensors to provide data indicative of features in an environment of the device 200.

Each of the applications 202a and 202b may include instructions that when executed cause the computing device 200 to perform specific tasks or functions. Applications 202a and 202b may be native applications (i.e., installed by a manufacturer of the computing device 200 and/or a manufacturer of the operating system 204) or may be a third-party application installed by a user of the computing device 200 after purchasing the computing device. A non-exhaustive list of example applications includes: a media player application that accepts media files as inputs and generates corresponding video and/or audio to the output device(s); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a bookmarking application, and a word processing, spreadsheet, and/or presentation application that accepts specifically formatted files as inputs and presents them via the output devices for viewing and/or editing.

The operating system 204 may interact with and manage hardware 206 to provide services for the applications 202a and 202b. For example, an application 202a may request that the operating system 204 direct an integrated camera of hardware 206 to capture a visual image and that the hardware 206 store the image to memory.

The hardware 206 may include, for example, a central processing unit (CPU), a graphics processor (GPU), memory, an input/output (I/O) interface, user input device (s), and output device(s). Components of hardware 206 may be controlled by instructions contained in applications 202a and 202b and operating system 204.

The central processing unit (CPU) may be operable to effectuate the operation of the device 200 by executing instructions stored in memory or disk storage. Such instructions may include the operating system 204 and the applications 202a and 202b. The CPU may, for example, comprise a single or multi-core processor, an application specific integrated circuit (ASIC), field programmable gate array (FPGA), and/or any other suitable circuitry.

The graphics processor may be operable to generate a video stream for output to the screen based on instructions and/or data received from the CPU. That is, data structures corresponding to images to be displayed on the screen may be stored to and read from the memory or disk storage by the CPU. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory. Program memory may store instructions executable by the CPU to effectuate operation of the operating system 204 and the applications 202a and 202b. Runtime memory may store data generated or used during execution of the operating system 204 or applications 202a and 202b.

The input/output (I/O) interface may be operable to receive signals from the input device(s), and provide corresponding signals to the CPU and/or the graphics processor. The input device(s) may include, for example, a mouse, a touchpad, a motion sensor, a trackball, a voice recognition device, a keyboard, or any other suitable input device which enables a user to interact with the device 200. The output devices may include, for example, a screen and speakers. The screen may be, for example, a liquid crystal display (LCD) screen, an OLED screen, an e-ink screen, and/or any other suitable device for presenting a graphical user interface.

Figure 3:
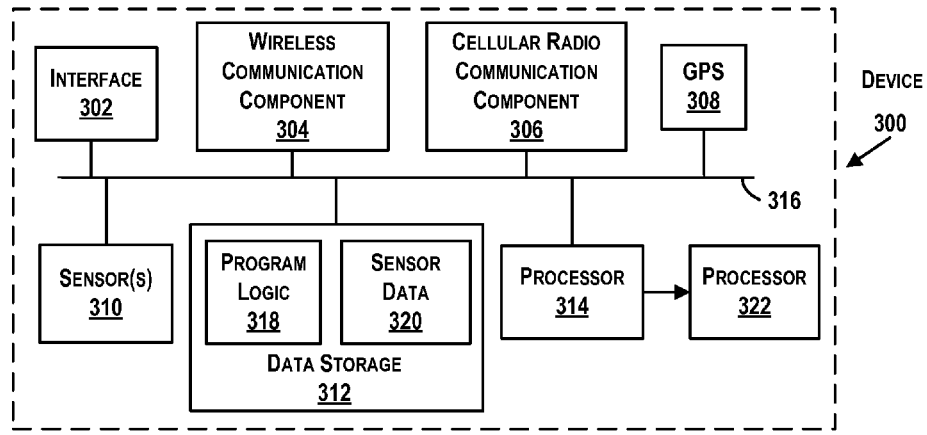
FIG. 3 illustrates a schematic drawing of an example device.

FIG. 3 illustrates a schematic drawing of an example device 300. In some examples, some components illustrated in FIG. 3 may be distributed across multiple computing devices. However, for the sake of example, the components are shown and described as part of one example device 300. The device 300 may be or include a mobile device, desktop computer, email/messaging device, tablet computer, robot, autonomous vehicle, or similar device that may be configured to perform the functions described herein. The device 300 may be similar to the devices 102-106 of FIG. 1 and/or the device 200 of FIG. 2.

In some implementations, the device 300 may include a device platform (not shown), which may be configured as a multi-layered Linux platform. The device platform may include different applications and an application framework, as well as various kernels, libraries, and runtime entities. In other examples, other formats or systems may operate the device 300 as well.

The device 300 may include an interface 302, a wireless communication component 304, a cellular radio communication component 306, a global position system (GPS) 308, sensor(s) 310, data storage 312, and a processor 314. Components illustrated in FIG. 3 may be linked together by a communication link 316. The device 300 may also include hardware to enable communication within the device 300 and between the device 300 and another computing device (not shown), such as a server entity. The hardware may include transmitters, receivers, and antennas, for example.

The interface 302 may be configured to allow the device 300 to communicate with another computing device (not shown), such as a server. Thus, the interface 302 may be configured to receive input data (e.g., instructions, requests, etc.) from one or more computing devices, and may also be configured to send output data to the one or more computing devices. In some examples, the interface 302 may also maintain and manage records of data received and sent by the device 300. In other examples, records of data may be maintained and managed by other components of the device 300. The interface 302 may also include a receiver and transmitter to receive and send data. In other examples, the interface 302 may also include a user-interface, such as a keyboard, microphone, touchscreen, etc., to receive inputs as well.

The wireless communication component 304 may be a communication interface that is configured to facilitate wireless data communication for the device 300 according to one or more wireless communication standards. For example, the wireless communication component 304 may include a Wi-Fi communication component that is configured to facilitate wireless data communication according to one or more IEEE 802.11 standards. As another example, the wireless communication component 304 may include a Bluetooth communication component that is configured to facilitate wireless data communication according to one or more Bluetooth standards. Other examples are also possible.

The processor 314 may be configured to determine one or more geographical location estimates of the device 300 using one or more location-determination components, such as the wireless communication component 304, the cellular radio communication component 306, or the GPS 308. For instance, the processor 314 may use a location-determination algorithm to determine a location of the device 300 based on a presence and/or location of one or more known wireless access points within a wireless range of the device 300. In one example, the wireless location component 304 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the device 300 may be determined.

In another instance, the processor 314 may use a location-determination algorithm to determine a location of the device 300 based on nearby cellular base stations. For example, the cellular radio communication component 306 may be configured to at least identify a cell from which the device 300 is receiving, or last received, signal from a cellular network. The cellular radio communication component 306 may also be configured to measure a round trip time (RTT) to a base station providing the signal, and combine this information with the identified cell to determine a location estimate. In another example, the cellular communication component 306 may be configured to use observed time difference of arrival (OTDOA) from three or more base stations to estimate the location of the device 300.

In still another instance, the processor 314 may use a location-determination algorithm to determine a location of the client device 300 based on signals sent by GPS satellites above the Earth. For example, the GPS 308 may be configured to estimate a location of the mobile device by precisely timing signals sent by the GPS satellites.

In yet another instance, the processor 314 may determine the location based outputs of the sensors 310. For example, the device 300 may include a map of magnetic fields and may associate the location of the device 300 with a magnetic field signature determined based on an output of a magnetometer included in the sensors 310. The map may indicate other features in the environment of the device 300 as well and the output from the sensors 310 may be similarly processed by the processor 314 to determine the location.

The sensor 310 may include one or more sensors, or may represent one or more sensors included within the device 300. Example sensors include an accelerometer, gyroscope, pedometer, light sensors, microphone, camera, compass, magnetometer, antennas, laser range finders, light detection and ranging systems (LIDARs), radio detection and ranging systems (RADARs), or other location and/or context-aware sensors.

The sensor 310 may provide output indicative of features in an environment of the device 300. In some examples, the features may include physical features in the environment such as objects, wireless transmitters, magnetic field, electromagnetic radiation pattern, sounds, etc. Additionally or alternatively, the features may include environmental conditions in the environment such as temperature, pressure, altitude, signal strengths of the wireless transmitters, direction of motion of the objects, speeds of the objects, etc.

Additionally or alternatively, in some examples, the device 300 may detect the features in the environment based on output of other components in the device 300. For example, the wireless communication component 304 and/or the cellular radio communication component 306 may include one or more antennae that detect the magnetic field, ambient electromagnetic radiation, or any other feature. Further, for example, the GPS 308 may provide position data associated with the features as well.

The data storage 312 may store program logic 318 that can be accessed and executed by the processor 314. The data storage 310 may also store collected sensor data 320 that may include data collected by any of the wireless communication component 304, the cellular radio communication component 306, the GPS 308, and/or any of sensors 310.

In some examples, the device 300 may transmit at least a portion of the stored data 320 for receipt by a server (not shown). For example, the stored data 320 may be structured as a plurality of datasets, each associated with a particular period of time when the data was collected, and the device 300 may select some or all of the plurality of datasets for transmission to the server via the interface 302, the wireless communication component 304, and/or the cellular radio communication component 306.

The communication link 316 is illustrated as a wired connection; however, wireless connections may also be used. For example, the communication link 316 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The device 300 is illustrated to include an additional processor 322. The processor 322 may be configured to control other aspects of the device 300 including displays or outputs of the device 300 (e.g., the processor 322 may be a GPU). Example methods described herein may be performed individually by components of the device 300, or in combination by one or all of the components of the device 300. In one instance, portions of the device 300 may process data and provide an output internally in the device 300 to the processor 322, for example. In other instances, portions of the device 300 may process data and provide outputs externally to other computing devices.

Figure 4:
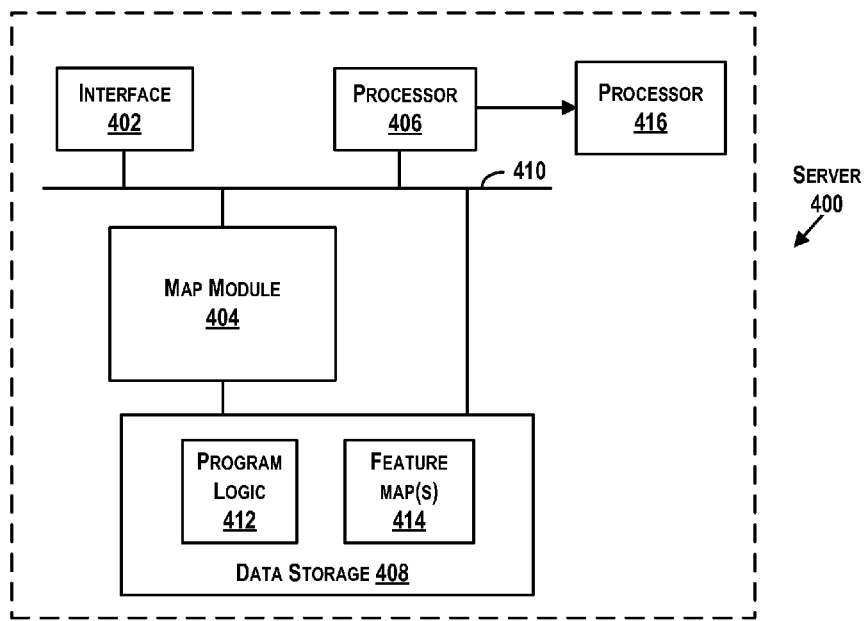
FIG. 4 illustrates a schematic drawing of another example device.

FIG. 4 illustrates a schematic drawing of another example device. In FIG. 4, the device takes a form of a server 400. In some examples, some components illustrated in FIG. 4 may be distributed across multiple servers. However, for the sake of example, the components are shown and described as part of one example server 400. The server 400 may be a computing device, cloud, or similar entity that may be configured to perform the functions described herein. The server 400 may be similar to the server 108 of the system 100.

The server 400 may include a communication interface 402, a map module 404, a processor 406, and data storage 408. All of the components illustrated in FIG. 4 may be linked together by a communication link 410 (e.g., wired or wireless link). The server 400 may also include hardware to enable communication within the server 400 and between the server 400 and another computing device (not shown). The hardware may include transmitters, receivers, and antennas, for example.

The communication interface 402 may allow the server 400 to communicate with another device (not shown), such as a mobile phone, personal computer, robot, autonomous vehicle, etc. Thus, the communication interface 402 may be configured to receive input data from one or more computing devices, and may also be configured to send output data/requests to the one or more computing devices. In some examples, the communication interface 402 may also maintain and manage records of data received and sent by the server 400. In other examples, records of data may be maintained and managed by other components of the server 400.

The map module 404 may be configured to receive data from a client device and determine/update a map of features in an environment that includes the device. The determination may be based on outputs of an accelerometer, gyroscope, camera, thermometer, microphone, antennae, or other sensors of the client device. The map module 404 may further be configured to determine and store a history of sensor measurements of the client device for later reprocessing based on updated data from the device or from other devices in the environment.

The data storage 408 may store program logic 412 that can be accessed and executed by the processor 406. The data storage 410 may also include one or more feature maps 414 that can be accessed by the processor 406 as well, for example, to retrieve information regarding various features in the environment of one or more devices wirelessly coupled to the server 400. Example features may include objects, sounds, etc., in the environment. Other features may include wireless access points, locations of satellites in a GPS network, floor plans of a building, etc., or any other type of information useful for determining a location of a client device and/or features in the environment that includes the device.

The server is illustrated with a second processor 416 which may be an application specific processor for input/output functionality. In other examples, functions of the processor 406 and the processor 416 may be combined into one component.

Within examples, measurements collected from various sensors of a device (such as WiFi components, GPS sensors, and inertial sensors, pressure sensors, temperature sensors, cameras, microphones, antennas, etc.) can be combined with information from external databases (such as known locations of WiFi access points or building floor plans) to update one or more of the feature maps 414 at various times. Recording the feature estimates at various times (or intervals/increments of time) may also produce a feature map history. Further, for example, the information from the various sensors may be utilized by the server 400 to generate/update a building floor plan or other geographic map.

Figure 5:
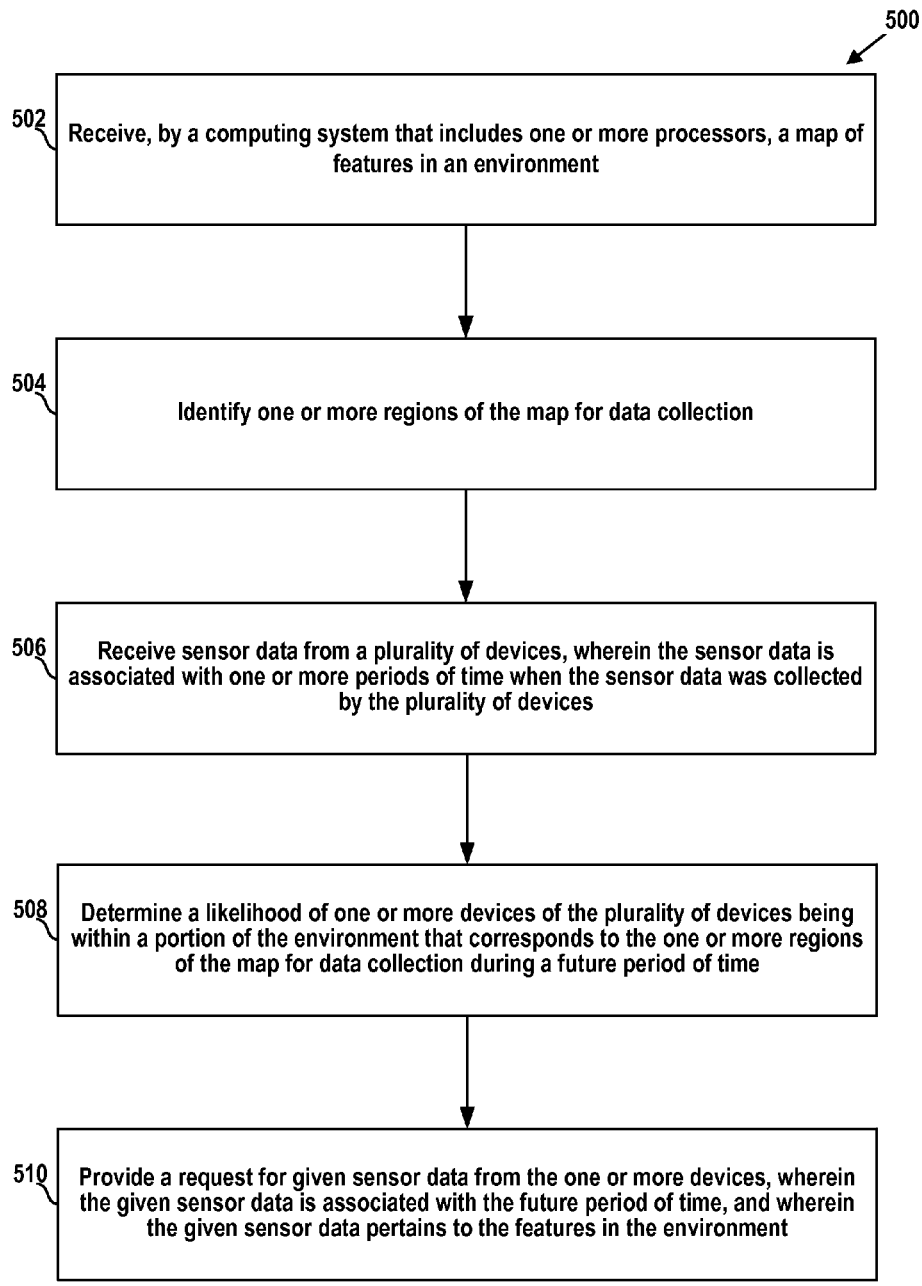
FIG. 5 is a block diagram of a method, according to an example embodiment.

FIG. 5 is a block diagram of a method 500, according to an example embodiment. Method 500 shown in FIG. 5 presents an embodiment of a method that could be used with the servers 104 and 400 or the devices 102-106, 200, and 300, for example. Method 500 may include one or more operations, functions, or actions as illustrated by one or more of blocks 502-510. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, a block in FIG. 5 may represent circuitry that is wired to perform the specific logical functions in the process.

At block 502, the method 500 includes receiving a map of features in an environment by a computing system that includes one or more processors. In some examples, the computing system may be a server similar to the server 108 and/or 400. In other examples, the computing system may not have the functionalities of a server. In some examples, the map may include a geographic map such as a building floor map (e.g., indoor environment) or a street map (e.g., outdoor environment). Other maps are possible as well such as maps of caves or mines.

The features may include physical features in the environment such as objects (e.g., furniture, metallic objects, magnetic conducting objects, electromagnetic conducting objects, etc.), wireless transmitters (e.g., WiFi access points, cellular broadcast towers, etc.), magnetic field (e.g., direction, magnitude, etc.), electromagnetic radiation pattern (e.g., RF noise, etc.), sounds (e.g., escalator sounds, air conditioner sounds, etc.) Additionally or alternatively, the features may include environmental conditions in the environment such as temperature, pressure, altitude (e.g., floor level in a building, etc.), signal strengths of the wireless transmitters (e.g., RSSI, etc.), direction of motion of the objects, speeds of the objects, etc.

Various systems herein may utilize the map to perform functions of the various systems. In one example, a wireless communications provider may utilize the map to optimize locations for new/existing wireless transmitters by identifying areas of the map where the signal strength of the wireless transmitters is less than a threshold. In another example, a navigational system provider may utilize the map to identify one-way streets in outdoor spaces or a general direction of motion in hallways of indoor spaces. In yet another example, a localization system may utilize the map to identify a location of the localization system (e.g., position of a robot).

An example scenario that includes a navigational system is as follows. A user of the system may request directions to a given location inside an office building. The system may access the map that includes a general direction of motion (e.g., features in the environment) in various hallways of the office building. The system may then suggest a route that allows the user to avoid given hallways where the general direction of motion is opposite to a direction that the user would travel in the route.

An example scenario that includes a localization system is as follows. Various moving devices such as robots, smartphones, tablets, autonomous vehicles, etc. may need to identify a current position of the moving system with a certain degree of certainty. By way of example, a robot in a warehouse may utilize a GPS to identify a position of the robot. However, due to the warehouse being an indoor environment, an error margin of the GPS reading may be too large (e.g., tens or hundreds of meters). In this example, the robot may access the map of features of block 502 to identify the location with greater accuracy. For example, the robot may compare readings of sensors other than the GPS with the features in the map to facilitate identifying the location. For instance, the map may indicate wireless transmitters (e.g., WiFi access points) in the warehouse, and thus the map may be utilized to reduce the uncertainty to a smaller error margin (e.g., less than ten meters). Further, the map may indicate a magnetic field signature of the warehouse. The magnetic field signature may be based on objects in the environment (e.g., warehouse) that are magnetic conductors (e.g., metallic furniture, etc.). Thus, by comparing the magnetic field feature in the map with readings from a magnetometer in the robot, the robot may be able to further reduce the uncertainty (e.g., two meters or less, etc.). Further, the map may indicate other features such as sounds of air conditioners, etc., that may be similarly used as further localization parameters by the robot. Therefore, in some examples, the map of features may be utilized by the localization system to identify the location of the system even without real-time input from the GPS. For example, the localization system (e.g., robot, etc.) may be operating in an underground or underwater environment and still be able to identify the location based on output from other feature sensors (e.g., magnetic field due to minerals in walls of a mine, etc.) and the map of features received at block 502.

Accordingly, some embodiments of the present disclosure including the method 500 and other methods herein may be included in or coupled to a system configured to operate based on the map described at block 502.

At block 504, the method 500 includes identifying one or more regions of the map for data collection. In the example scenarios at block 502, there may be various reasons for data collection to update the map.

In one example, the one or more regions may include an insufficient amount of data pertaining to the features. For example, the one or more regions may correspond to a room or hallway in a building with little or no indication of sounds in the map. Thus, in some examples, the method 500 may include identifying the one or more regions based on an amount of data pertaining to one or more of the features being less than a threshold amount.

In another example, the features in the environment may change over time. For example, objects (e.g., furniture) in the environment may be moved and responsively, various other features may be affected (e.g., direction of motion of people in a vicinity of the objects, magnetic field, electromagnetic radiation pattern, sounds, etc.). Such changes, for example, may be detected based on the computing system comparing the map with a previous version of the map that is included in the computing system.

Accordingly, in some examples, the method 500 may include identifying the one or more regions based on a comparison between the map and the previous version of the map. Additionally or alternatively, in some examples, the method 500 may include determining a given time that corresponds to a previous update to the one or more regions of the map. In these examples, identifying the one or more regions at block 504 may be based on the given time being prior to a threshold time.

At block 506, the method 500 includes receiving sensor data from a plurality of devices. The sensor data may be associated with one or more periods of time when the sensor data was collected by the plurality of devices.

In some examples, the plurality of devices may include mobile devices such as smartphones, tablets, etc., that are coupled to the computing system via a wired or wireless connection. In other examples, the plurality of devices may include autonomous vehicles such as robotic localization devices that are coupled to the computing system via a wired or wireless connection. For example, the plurality of devices may be included in a simultaneous localization and mapping (SLAM) system configured to perform the functions of the method 500 to map the environment. Thus, the sensor data from the plurality of devices may include data from sensors such as pressure sensors, magnetometers, etc., in the plurality of devices. Additionally, for example, at least some of the plurality of devices may be included in the environment of the map during the one or more periods of time and thus, at least a portion of the sensor data may indicate the features in the environment. The sensor data, for example, may correspond to sensor traces from the plurality of devices during the one or more periods of time.

In some examples, the method 500 may include determining a rate of change of one or more of the features within a portion of the environment that corresponds to the one or more regions of the map based on the sensor data. In these examples, identifying the one or more regions at block 504 may be based on the rate of change being greater than a threshold rate. For example, a first device may detect a particular set of WiFi networks at a given position in the environment during a first time-period. Further, a second device may detect another set of WiFi networks at the given position during a second time-period. In turn, the computing system may detect that a rate of change of the feature (e.g., the WiFi networks) is greater than the threshold rate at the given position based on the sensor data from the first device and the second device. Accordingly, for example, the computing system may identify the one or more regions that include the given position for data collection at a later time.

At block 508, the method 500 includes determining a likelihood of one or more devices of the plurality of devices being within a portion of the environment that corresponds to the one or more regions of the map for data collection during a future period of time.

In an example scenario, the environment indicated by the map may correspond to a multi-story building. In turn, the one or more devices may correspond to handheld devices carried by users who work in the building or who visit the building on a regular basis (e.g., including the one or more periods of time). Thus, based on the sensor data, the computing system may determine that the one or more devices, from within the plurality of devices, are likely to be in the building at a future time (e.g., next day).

Accordingly, in some examples, the method 500 may include determining a pattern of motion of the one or more devices. In these examples, determining the likelihood may be based on the pattern.

However, in the example scenario, the sensor data received at block 506 may not correspond to the one or more devices being in the portion of the environment that corresponds to the one or more regions of the map. For example, the sensor data from a given device during several periods of time may correspond to one location (e.g., user is sitting on an office chair for an extended period of time) other than a location associated with the one or more regions.

Therefore, the computing system may determine the future period of time when the one or more devices are expected to be in the portion of the environment that corresponds to the one or more regions based also on the sensor data. For example, the one or more regions may include a particular hallway in the building. In this example, the sensor data at block 506 for the given device may include one dataset for a first time-period when the given device is at one end of the hallway, and another dataset for a second time-period when the given device is at another end of the hallway. Thus, the computing system may expect the given device to traverse the hallway during a time-period between the first time-period and the second time-period. In turn, for example, the computing system may determine the given period of time for data collection in a later day that corresponds to the time-period between the first time-period and the second-time period.

Accordingly, in some examples, the method 500 may include determining the future period of time for collection of the given sensor data by the one or more devices based on an anticipation of a reoccurrence of the pattern.

In one example, the one or more devices may include a device operated by a janitor or mailman who traverses the building in a given work day according to the pattern of motion. Thus, areas of the building that correspond to the one or more regions of the map identified at block 504 for data collection may correspond to areas along a route of the device. In turn, the method 500 may identify the future period of time for data collection at a later time (e.g., next day) based on the anticipation of the reoccurrence of the pattern. By way of example, a user of the one or more devices may be expected to travel at a steady rate (e.g., the pattern). In this example, the computing system may detect such pattern and identify the given period of time that corresponds to the steady rate of motion of the one or more devices.

In another example, the computing system may attempt to update a magnetic field map for various parts of the building. In the example, the sensor data from a first device may correspond to the sensor data from a user on the first floor, and the sensor data from a second device may correspond to the sensor data from another user on the second floor. The computing system may differentiate between the two floors based on pressure sensor readings from the first device and the second device. However, the sensor data from the first device may be associated with a first time-period other than a second-time period of the sensor data from the second device. In turn, comparing the pressure readings may be prone to error due to the difference in time. For example, if a temperature of the building at the first time-period was different from the temperature at the second time-period, the pressure readings may indicate a same altitude even if the first device and the second device were on different floors. Accordingly, in this example, the computing system may determine the future period of time for both the first device and the second device for data collection at a later time.

At block 510, the method 500 includes providing a request for given sensor data from the one or more devices. The given sensor data may be associated with the future period of time. The given sensor data may pertain to the features in the environment.

In some examples, the request may be based on the likelihood being greater than a threshold likelihood. In turn, for example, the given sensor data may collected by the one or more devices at a later time and may correspond to the one or more regions of the map according to suitable probabilistic estimates determined by the computing system. Further, in some examples, other devices of the plurality of devices may be instructed by the computing system to avoid data collection during the given period of time and therefore save energy associated with the data collection.

In some examples, the request may trigger the data collection by the one or more devices in real-time (e.g., the request may be transmitted at a particular time included in the given period of time). In other examples, the request may cause the one or more devices to trigger the data collection in anticipation of the given period of time. In yet other examples, the request may cause the one or more devices to identify traces of data (e.g., associated with the future period of time) for processing and/or storage. In still other examples, the request may trigger transmission of the given sensor data by the one or more devices to the computing system or to any other device (e.g., other devices of the one or more devices, etc.). For example, where the one or more devices are configured to transmit a threshold amount of sensor data associated with a given day, the request may facilitate selection of the given sensor data from within all data collected by the one or more devices to facilitate data transmission within the threshold amount. Other examples are possible as well.

In some examples, the method 500 may also include receiving the given sensor data from the one or more devices, and updating the one or more regions of the map based on the given sensor data.

Figure 6:
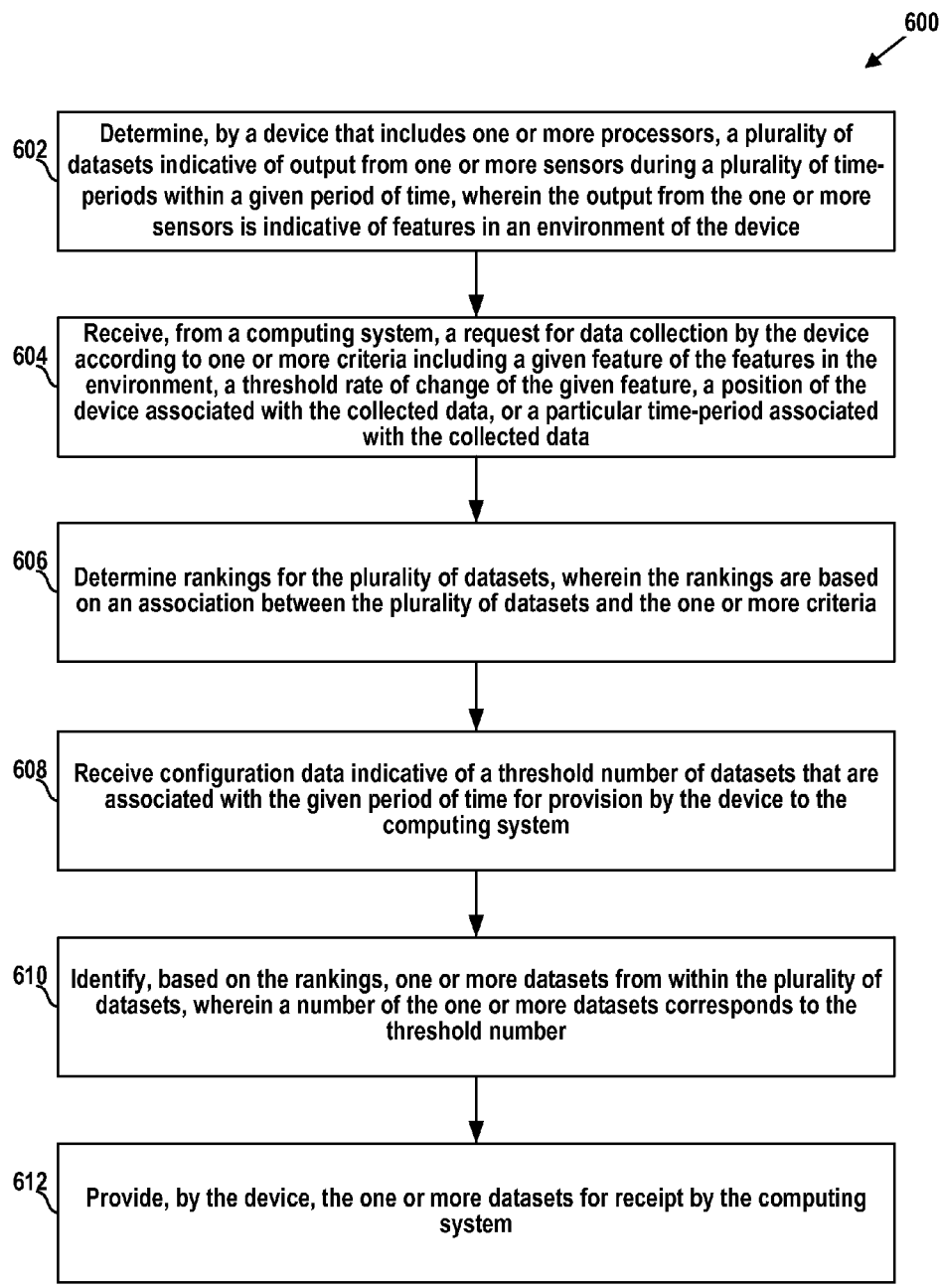
FIG. 6 is a block diagram of another method, according to an example embodiment.

FIG. 6 is a block diagram of another method 600, according to an example embodiment. Method 600 shown in FIG. 6 presents an embodiment of a method that could be used with the servers 104 and 400 or the devices 102-106, 200, and 300, for example. Method 600 may include one or more operations, functions, or actions as illustrated by one or more of blocks 602-612. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, the method 600 includes determining a plurality of datasets indicative of output from one or more sensors during a plurality of time-periods within a given period of time by a device that includes one or more processors. The output from the one or more sensors may be indicative of features in an environment of the device. The device may be similar to the device 300, for example, and the one or more sensors may be similar to the sensors 310 of the device 300. Further, the plurality of datasets may be similar to the sensor data 320 of the device 300.

In some examples, the plurality of datasets may correspond to sensor traces of the features in the environment of the device during the one or more time-periods. Further, the plurality of datasets may be associated with position information based also on the output from the one or more sensors. For example, the device may include a position sensor, such as a GPS, to associate the plurality of datasets with the position information.

In some examples, the plurality of datasets may each have a given duration. Such duration may be indicated by a configuration of the device. For example, the plurality of datasets may correspond to five minute sensor traces from the one or more sensors.

The features may include physical features in the environment such as objects (e.g., furniture, metallic objects, magnetic conducting objects, electromagnetic conducting objects, etc.), wireless transmitters (e.g., WiFi access points, cellular broadcast towers, etc.), magnetic field (e.g., direction, magnitude, etc.), electromagnetic radiation pattern (e.g., RF noise, etc.), sounds (e.g., escalator sounds, air conditioner sounds, etc.) Additionally or alternatively, the features may include environmental conditions in the environment such as temperature, pressure, altitude (e.g., floor level in a building, etc.), signal strengths of the wireless transmitters (e.g., RSSI, etc.), direction of motion of the objects, speeds of the objects, etc. Further, in some examples, the features may include given features that pertain to motion of the objects in the environment. For example, elements such as doors, stairs, elevators, corridors, etc., may influence a pattern of motion of people in the environment of the plurality of devices, and in turn, the plurality of devices may collect data pertaining to such features.

At block 604, the method 600 includes receiving a request for data collection by the device from a computing system. The request for the data collection may be according to one or more criteria. The one or more criteria may include a given feature of the features in the environment, a threshold rate of change of the given feature, a position of the device associated with the collected data, or a particular time-period associated with the collected data. The computing system may be a server, similarly to the servers 108 and/or 400, or may be any other computing system that does not include the functionality of a server.

By way of example, the one or more criteria may include various criteria such as time (e.g., time of day, day of week, season, etc.), weather (e.g., temperature, humidity, etc.), location (e.g., the position of the device, etc.), or any other criteria pertaining to a context of the device for triggering the data collection by the device. Further, for example, the one or more criteria may include a density of objects (e.g., people, etc.) in the environment. For example, objects that include water may affect electromagnetic radiation in the environment, and thus, the device may associate collected data with the density of the objects as well.

At block 606, the method 600 includes determining rankings for the plurality of datasets. The rankings may be based on an association between the plurality of datasets and the one or more criteria.

In a first example, the request may indicate datasets associated with magnetic field information from a magnetometer sensor in the device. In a second example, the request may indicate datasets that correspond to the threshold rate of change, for example, of wireless transmitters detected by the device. In a third example, the request may indicate datasets associated with the device being in a particular location. In a fourth example, the request may indicate datasets associated with the particular time-period from within the plurality of time-periods. Other examples are possible as well.

Thus, for example, the device at block 606 may assign various rankings to the plurality of datasets determined at block 602 according to the one or more criteria. For example, a particular dataset that satisfies more than one of the one or more criteria may be assigned a higher ranking than another dataset that satisfies only one of the one or more criteria. Other examples are possible as well. For example, any suitable probabilistic estimate about an uncertainty of the one or more criteria may be included in the determination of the rankings.

At block 608, the method 600 includes receiving configuration data indicative of a threshold number of datasets that are associated with the given period of time for provision by the device to the computing system. For example, such threshold number may be due to energy-saving considerations or privacy considerations. By way of example, the device may be permitted to transmit three sensor traces (e.g., datasets) associated with the plurality of time-periods within a given day based on the configuration data. In some examples, the given duration of the datasets may also be indicated in the configuration data. For example, the configuration data may indicate five minute durations for the datasets provided by the device to the computing system.

At block 610, the method 600 includes identifying one or more datasets from within the plurality of datasets based on the rankings A number of the one or more datasets may correspond to the threshold number. By way of example, the one or more datasets having the highest rankings may be identified by the device at block 610. In turn, the one or more datasets may include datasets that have a high probability of satisfying the one or more criteria indicated by the request at block 604.

In some examples, the one or more criteria may indicate the threshold rate of change. In these examples, the method 600 may also include detecting a rate of change of the given feature being greater than the threshold rate indicated by the request based on the output from the one or more sensors. In one example, the device may detect being in motion at a particular speed based on the output from the one or more sensors (e.g., gyroscope, accelerometer, GPS, etc.) at a speed (e.g., rate of change) that is greater than a threshold speed (e.g., the threshold rate of change). In another example, the device may detect the rate of change of other features such as the magnetic field in the environment, sounds in the environment, the electromagnetic radiation pattern in the environment, etc. The detection may be associated with a given time when the output was received from the one or more sensors.

Accordingly, in some examples, the method 600 may also include identifying a given dataset from within the plurality of datasets associated with a given time-period that includes the given time. In these examples, identifying the one or more datasets at block 610 may include identifying the given dataset.

In some examples, the method 600 may also include receiving a map of given features in the environment of the device. In one example, the map may be received from the computing system. In another example, the map may be included in a memory of the device, and the given features may correspond to previous output from the one or more sensors. In these examples, the method 600 may also include comparing the given features of the map with the features indicated by the output from the one or more sensors. For example, the map may indicate that a current position of the device includes a particular group of wireless transmitters, and the output from the one or more sensors may indicate a different group of wireless transmitters. Accordingly, in these examples, identifying the one or more datasets may be based on the comparison. For example, the one or more datasets may include a dataset that corresponds to a time-period when given features were different from the detected features. However, in other examples, triggering the data collection by the device and/or determining the rankings for the plurality of datasets at block 606 may be performed by the device without use of such map. For example, a simultaneous localization and Mapping (SLAM) technique that does not require an initial map (e.g., FootSLAM, etc.) may be performed by the device of the method 600 for the data collection.

At block 612, the method 600 includes providing the one or more datasets by the device for receipt by the computing system. For example, the device may wirelessly transmit the one or more datasets for receipt by the computing system or by a gateway coupled to the computing system via another wired/wireless connection. In some examples, the method 600 may also include discarding (e.g., removing) other datasets of the plurality of datasets from a memory of the device.

Figure 7:
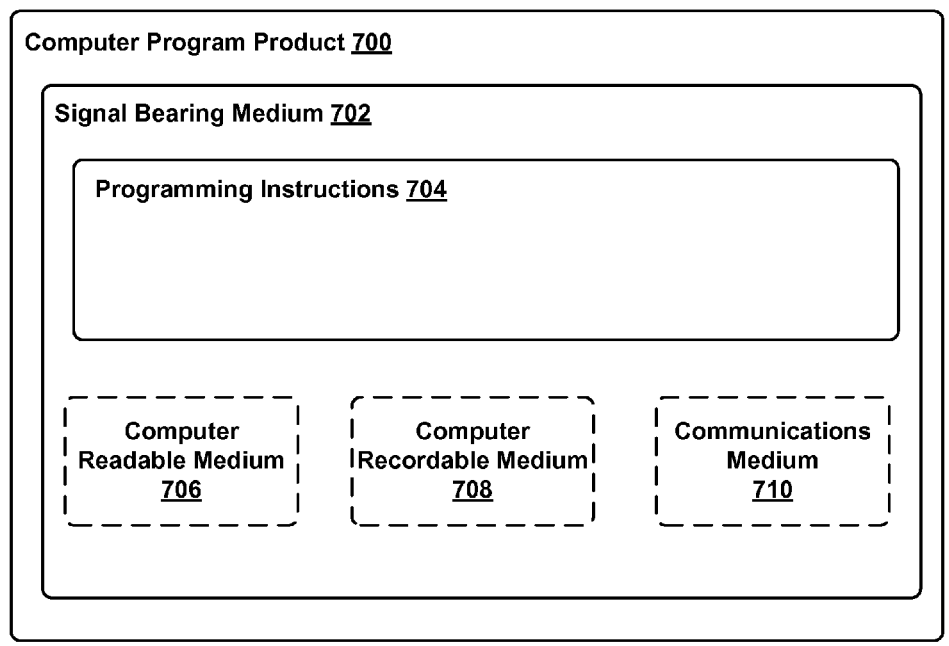
FIG. 7 depicts an example computer readable medium configured according to an example embodiment.

FIG. 7 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. methods 500 and 600) may be implemented by computer program instructions encoded on a computer readable storage media in a machine-readable format, or on other media or articles of manufacture (e.g., program logic 318 and/or 412 of the device 300 and/or the server 400). FIG. 7 is a schematic illustrating a conceptual partial view of an example computer program product that includes a computer program for executing a computer process on a computing device, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may be a computer-readable medium 706, such as, but not limited to, a hard disk drive, a Compact Disc (CD), a Digital Video Disk (DVD), a digital tape, memory, etc. In some implementations, the signal bearing medium 702 may be a computer recordable medium 708, such as, but not limited to, memory, read/write (R/W) CDs, R/W DVDs, etc. In some implementations, the signal bearing medium 702 may be a communication medium 710 (e.g., a fiber optic cable, a waveguide, a wired communications link, etc.). Thus, for example, the signal bearing medium 702 may be conveyed by a wireless form of the communications medium 710.

The one or more programming instructions 704 may be, for example, computer executable and/or logic implemented instructions. In some examples, a computing device may be configured to provide various operations, functions, or actions in response to the programming instructions 704 conveyed to the computing device by one or more of the computer readable medium 706, the computer recordable medium 708, and/or the communications medium 710.

The computer readable medium 706 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, by a computing system that includes one or more processors, a map of physical features in a physical environment;
determining, based on the map, a given time that corresponds to a previous update to the one or more regions of the map;
based on at least the given time being prior to a threshold time, identifying one or more regions of the map for data collection;
receiving sensor data from a plurality of devices, wherein the sensor data is associated with one or more periods of time when the sensor data was collected by the plurality of devices;
determining, based on the sensor data, a likelihood of one or more devices of the plurality of devices being within a portion of the physical environment that corresponds to the identified one or more regions of the map for data collection during a future period of time; and
based on the likelihood being greater than a threshold likelihood, and further based on the identified one or more regions, controlling the one or more devices to collect, during the future period of time, given sensor data in the portion of the physical environment that corresponds to the identified one or more regions, wherein the given sensor data pertains to physical features in the portion of the physical environment that corresponds to the identified one or more regions.

2. The method of claim 1, further comprising:
determining, based on the sensor data, a rate of change of one or more of the physical features within the portion of the physical environment that corresponds to the identified one or more regions of the map, wherein identifying the one or more regions is further based on the rate of change being greater than a threshold rate.

3. The method of claim 1, wherein identifying the one or more regions is further based on the one or more regions being associated with an amount of data pertaining to the physical features in the physical environment that is less than a threshold amount.

4. The method of claim 1, further comprising:
determining, based on the sensor data, a pattern of motion of the one or more devices, wherein determining the likelihood is based on the pattern.

5. The method of claim 4, further comprising:
determining, based on an anticipation of a reoccurrence of the pattern, the future period of time for collection of the given sensor data by the one or more devices, wherein providing the request is based on the determination of the future period of time.

6. The method of claim 1, wherein the physical features in the physical environment include one or more of: objects in the physical environment, motion of given objects in the physical environment, a magnetic field in the physical environment, an electromagnetic radiation pattern in the physical environment, wireless transmitters in the physical environment, signal strengths of the wireless transmitters in the physical environment, sounds in the physical environment, or an altitude of a given portion of the physical environment.

7. The method of claim 1, further comprising:
receiving the given sensor data from the one or more devices; and
updating, based on the given sensor data, the identified one or more regions of the map.

8. A computing system comprising:
one or more processors; and
data storage configured to store instructions executable by the one or more processors to cause the computing system to:
receive a map of physical features in a physical environment;
determine, based on the map, a given time that corresponds to a previous update to the one or more regions of the map;
based on at least the given time being prior to a threshold time, identify one or more regions of the map for data collection;
receive sensor data from a plurality of devices, wherein the sensor data is associated with one or more periods of time when the sensor data was collected by the plurality of devices;
determine, based on the sensor data, a likelihood of one or more devices of the plurality of devices being within a portion of the physical environment that corresponds to the identified one or more regions of the map for data collection during a future period of time; and
based on the likelihood being greater than a threshold likelihood, and further based on the identified one or more regions, control the one or more devices to collect, during the future period of time, given sensor data in the portion of the physical environment that corresponds to the identified one or more regions, wherein the given sensor data pertains to physical features in the portion of the physical environment that corresponds to the identified one or more regions.

9. The computing system of claim 8, wherein the instructions executable by the one or more processors further cause the computing system to:
determine, based on the sensor data, a rate of change of one or more of the physical features within the portion of the physical environment that corresponds to the identified one or more regions of the map, wherein identifying the one or more regions is further based on the rate of change being greater than a threshold rate.

10. The computing system of claim 8, wherein identifying the one or more regions is further based on the one or more regions being associated with an amount of data pertaining to the physical features in the physical environment that is less than a threshold amount.

11. The computing system of claim 8, wherein the instructions executable by the one or more processors further cause the computing system to:
determine, based on the sensor data, a pattern of motion of the one or more devices, wherein determining the likelihood is based on the pattern.

12. The computing system of claim 11, wherein the instructions executable by the one or more processors further cause the computing system to:
determine, based on an anticipation of a reoccurrence of the pattern, the future period of time for collection of the given sensor data by the one or more devices, wherein providing the request is based on the determination of the future period of time.

13. The computing system of claim 8, wherein the instructions executable by the one or more processors further cause the computing system to:
   receive the given sensor data from the one or more devices; and
   update, based on the given sensor data, the identified one or more regions of the map.

\* \* \* \* \*